United States Patent [19]
Kolb et al.

[11] Patent Number: 5,613,509
[45] Date of Patent: Mar. 25, 1997

[54] METHOD AND APPARATUS FOR REMOVING CONTAMINANTS AND COATINGS FROM A SUBSTRATE USING PULSED RADIANT ENERGY AND LIQUID CARBON DIOXIDE

[75] Inventors: Alan C. Kolb, Rancho Santa Fe, Calif.; Leonard W. Braverman, New Fairfield, Conn.; Cyril J. Silberman, Minnetonka, Minn.; Richard R. Hamm, San Diego; Michael C. Cates, Del Mar, both of Calif.

[73] Assignee: Maxwell Laboratories, Inc., San Diego, Calif.

[21] Appl. No.: 460,732

[22] Filed: Jun. 2, 1995

Related U.S. Application Data

[63] Continuation-in-part of Ser. No. 204,852, Mar. 2, 1994, which is a continuation-in-part of Ser. No. 813,872, Dec. 24, 1991, Pat. No. 5,328,517.

[51] Int. Cl.$^6$ ........................................................ B08B 3/12
[52] U.S. Cl. .............................. 134/56 R; 134/1; 134/19; 134/201; 15/320
[58] Field of Search ................................ 134/56 R, 57 R, 134/58 R, 201, 102.2, 1, 7, 19; 15/302, 320; 250/205

[56] References Cited

U.S. PATENT DOCUMENTS

| | | | |
|---|---|---|---|
| 3,700,850 | 10/1972 | Lumley et al. | 219/121 |
| 3,986,391 | 10/1976 | Vahaviolos | 219/121 |
| 4,114,018 | 9/1978 | VonAllmen | 219/121 |
| 4,249,956 | 2/1981 | Hartman | 134/7 |
| 4,398,961 | 8/1983 | Mason | 134/19 |
| 4,419,562 | 12/1983 | Jon et al. | 219/130 |
| 4,491,484 | 1/1985 | Williams | 134/4 |
| 4,504,727 | 3/1985 | Melcher et al. | 219/121 |
| 4,543,486 | 9/1985 | Rose | 250/492 |
| 4,582,540 | 4/1986 | Allback | 134/1 |
| 4,588,885 | 5/1986 | Lovoi et al. | 250/226 |
| 4,631,250 | 12/1986 | Hayashi | 430/329 |
| 4,655,847 | 4/1987 | Ichinoseki et al. | 134/7 |
| 4,682,594 | 7/1987 | Mok | 128/303 |

(List continued on next page.)

FOREIGN PATENT DOCUMENTS 9013807  11/1990  WIPO.

OTHER PUBLICATIONS

Klauser, H.E., "Closed–Loop Laser Control System", *IBM Technical Disclosure Bulletin*, 24(9), (Feb. 1882).

Yaeck, C.E., et al., "Transient Photoacoustic Monitoring of Pulse Laser Drilling", *Appl. Phys. Lett.*, 41(11), (Dec. 1, 1982).

Cates, M.C., "Modeling of the Flashblast Coating Removal Process", *Proceedings of the DOD/Industry Advanced Coatings Removal Conference*, San Diego, CA (Apr. 30–May 2, 1991).

Schmitz, W.N., "Xenon Flashlamp/CO$_2$ Pellet Blasting or Paint Stripping/Coatings Removal", *Proceedings of the DOD/Industry Advanced Coatings Removal Concerence*, San Diego, CA (Apr. 30/May 2, 1991).

*Primary Examiner*—Frankie L. Stinson
*Attorney, Agent, or Firm*—Fitch, Even, Tabin & Flannery

[57] ABSTRACT

An improved system and method are provided for removing material coatings or contaminants such as paints from a structure. The system and method include a radiant energy source, such as a flashlamp, for irradiating the target area of the structure with the radiant energy sufficient to initiate the pyrolysis and/or ablation of the coating or contaminant and a low temperature carbon dioxide stream which is directed at the target area to disperse the material from the structure, clean the exposed surface and cool the underlying substrate. The low temperature carbon dioxide stream is formed from a liquid carbon dioxide from a liquid carbon dioxide source which undergoes phase transition to yield a predetermined amount of low temperature carbon dioxide gas and carbon dioxide snow. The system and method eliminate the need for a carbon dioxide pelletizer, a carbon dioxide pellet transport hopper, and a compressed carrier gas which are used in related systems.

12 Claims, 6 Drawing Sheets

U.S. PATENT DOCUMENTS

| | | | |
|---|---|---|---|
| 4,693,756 | 9/1987 | Schlick | 134/7 |
| 4,718,974 | 1/1988 | Minaee | 156/643 |
| 4,731,125 | 3/1988 | Carr | 134/17 |
| 4,737,628 | 4/1988 | Lovoi | 250/226 |
| 4,756,765 | 7/1988 | Woodroffe | 134/1 |
| 4,803,021 | 2/1989 | Werth et al. | 264/25 |
| 4,806,171 | 2/1989 | Whitlock et al. | 134/7 |
| 4,836,858 | 6/1989 | Reinhart | 134/1 |
| 4,867,796 | 9/1989 | Asmus et al. | 131/1 |
| 4,994,639 | 2/1991 | Dickinson et al. | 219/121 |
| 5,013,366 | 5/1991 | Jackson et al. | 134/1 |
| 5,024,968 | 6/1991 | Engelsberg | 437/173 |
| 5,026,964 | 6/1991 | Somers et al. | 219/121.7 |
| 5,035,750 | 7/1991 | Tada et al. | 134/7 |
| 5,062,898 | 11/1991 | McDermott et al. | 134/7 |
| 5,194,723 | 3/1993 | Cates et al. . | |
| 5,204,517 | 4/1993 | Cates et al. . | |
| 5,217,925 | 6/1993 | Ogawa et al. | 134/7 |
| 5,225,000 | 7/1993 | Fujii et al. | 134/1 |
| 5,281,798 | 1/1994 | Hamm et al. . | |
| 5,328,517 | 7/1994 | Cates et al. | 134/7 |

METHOD AND APPARATUS FOR REMOVING CONTAMINANTS AND COATINGS FROM A SUBSTRATE USING PULSED RADIANT ENERGY AND LIQUID CARBON DIOXIDE

This is a continuation-in-part of co-pending United States Patent application Ser. No. 08/204,852 filed on Mar. 2, 1994. U.S. patent application Ser. No. 07/813,872 is a continuation-in-part of U.S. Pat. No. 5,328,517 filed on Dec. 24, 1991.

The present invention relates to an improved material removal method and system, and more particularly, to a material removal method and system that uses an intense, pulsed light source to pyrolyze and/or ablate contaminants or coatings on a substrate and a source of liquid carbon dioxide which undergoes phase transition to low temperature carbon dioxide gas and carbon dioxide snow which is subsequently directed towards the substrate to remove the contaminant or coating while simultaneously cleaning and cooling the substrate surface.

BACKGROUND OF THE INVENTION

Material coatings play an important role in our manufactured-products-based society. Coatings such as paints, lacquers, adhesives, resins, diamond films, and polymer films are used on many products used in both commercial and military applications. Material coatings will often improve the reliability, maintainability and quality of many products including microelectronics, optical surfaces, machinery, vehicles and standing structures. Such coatings provide immunity to corrosion, thermal insulation, as well as environmental shielding. In some applications the material coatings are required for very complex and specialized functions. These material coatings are selected because of specialized properties such as radio frequency absorbing properties, light absorption or reflection properties, and other predetermined optical properties. Many coatings are applied merely for aesthetic purposes such as appearance enhancement or item identification.

During the life of many manufactured products, such as bridges, aircraft, automobiles, and ships, painted coatings require removal and replacement for a variety of reasons. For example, refurbishment of the paint on aircraft is a regular maintenance item. Commercial airlines repaint their aircraft about every 4–5 years of service. The United States military typically repaints its aircraft after three years of service, or less. Coatings on the exterior surfaces of large ships or bridges require periodic refurbishment in order to prevent or inhibit corrosion. Specialized coatings may only extend the service life of an end item for several years before serious degradation and failure may occur.

The removal of paint from the surfaces of aircraft presents special problems. Aircraft surfaces are large, irregularly shaped, and relatively delicate. Because the surfaces of aircraft are typically lightweight aluminum or organically based composite materials, such surfaces and the underlying substrates are particularly susceptible to damage while undergoing paint removal that could degrade their structural integrity.

Many different methods have been used to remove painted coatings. One type, the particle medium blast (PMB) method, involves impinging the surface to be stripped with particles such as bb's, plastic media, steel shot, sodium bicarbonate, wheat starch, and/or sand. However, PMB methods energetic enough by themselves to remove hardened coatings such as paint may damage delicate surfaces. For example, if the nozzle supplying the impinging particles dwells too long at one location, the impinged surface may become pitted or stress hardened. This is especially important to avoid with regard to the surfaces of aircraft since pitting or stress hardening may change the mechanical properties of the surface material. High-energy PMB methods may also deform the surface of the substrate sufficiently to mask fatigue cracks and other anomalies that, if undetected and uncorrected, could lead to catastrophic failure of the substrate. PMB methods may also damage putty joints often found on aircraft between surface plates. Moreover, most PMB processes generate a large amount of particulate waste requiring costly disposal, since this waste is often contaminated by toxic constituents of the coating.

Another method involves the application of chemical agents to painted surfaces in order to chemically breakdown the layers of paint, thereby stripping the paint away from the surface to be exposed. However, such compounds may pose a risk to human health, are usually toxic, and often not biodegradable. Overall, these types of compounds are difficult and costly to dispose of because they present serious environmental problems. Government regulations are increasingly restrictive of the use of such agents.

Still other methods involving mechanical paint removal techniques have also been employed. For example, U.S. Pat. No. 4,836,858, entitled, "Ultrasonic Assisted Paint Removal Method" discloses a hand held tool, which uses an ultrasonic reciprocating edge placed in contact with the surface to be stripped. Unfortunately, employment of this tool is labor intensive and relies upon the skill of a human operator to use it effectively. Further, control of this tool is a problem when applied to aircraft because the aircraft surface may be damaged if there is excessive tool dwell at one location.

None of the aforementioned methods for removing paint are suitable for removing coatings from carbon epoxy surfaces. PMB and other mechanical grinding methods sufficiently energetic by themselves to remove paint have proven to damage composite materials. The removal of paint with chemical compounds does not offer a satisfactory solution because such chemicals tend to attack the composites, as well as the paint.

Radiant energy paint removal techniques are also known in various related art. U.S. Pat. No. 4,588,885, entitled "Method Of And Apparatus For The Removal Of Paint And The Like From A Substrate" discloses a method for removing paint that employs a pulsed laser directed to irradiate a target area of a painted structure to vaporize incremental layers of paint. In between laser pulses, a second light source illuminates the target area with light which reflects off of the target area and is received by a grating. The grating produces a spatial dispersion on a focal plane array. Electrical signals generated by the focal plane array represent the spatial spectral dispersion of the light and are used to control the output of the laser.

A problem with the system described in U.S. Pat. No. 4,588,885 is that it is very difficult to cover large areas, such as the surface of an aircraft, with the pinpoint beam of a laser. To do so requires sophisticated scanning and rastering techniques. Furthermore, a laser powerful enough to vaporize paint requires high power. Employment of such a powerful laser requires a large capital investment in order to provide space to operate the laser, as well as laser stops to prevent the laser beam from inadvertently escaping the work area and even the building where it is being used. Such a laser poses a serious danger to humans, who must be kept out of the area where the laser operates. Therefore, there is a need for a paint removal system that avoids the limitations of laser-based paint removal systems.

In addition, U.S. Pat. No. 5,281,798 and U.S. Pat. No. 5,194,723 each disclose a material removal process which uses a radiant energy together with a particle stream. In both disclosures, a preferred particle stream of carbon dioxide pellets is directed at the irradiated surface.

Another common problem with the related art systems which use radiant energy for removing paint and similar such materials is that some or all of the removed material is in the form of vapors which often deposit on the optical components of the system. Such a problem severely limits the usefulness of the equipment for any substantial length of time. Frequently, interrupting the paint removal process to clean the equipment involves additional costs due to the increased time and labor involved.

It should also be noted that the use of composite structures, manufactured, for example, of graphite epoxy or other reinforced plastic materials is becoming increasingly common. Many aircraft and automobiles extensively employ carbon epoxy materials for surface structures. Such structures are also painted or coated for a variety of reasons including aesthetics, identification, and camouflage. However, such painted and coated surfaces deteriorate under the action of weather and the mechanical forces to which they are subjected, thus requiring removal and replacement. A significant problem associated with removing paint or other coatings from these non-metallic substrates is the resulting damage to the composite substrate.

Other than hand sanding, there have been no suitable methods or apparatus for removing paint from non-metallic composite surfaces. PMB and mechanical grinding methods sufficiently energetic to remove paint by themselves have been proven to damage composite materials. The removal of paint with chemical agents does not offer a satisfactory solution because such chemicals tend to attack the composites, as well as the paint. Some composites are sensitive to high temperature, such that prior high temperature methods of removing coatings are not satisfactory.

Yet another problem associated with related art removal techniques is that many of the discussed techniques do not address the need to clean the substrate surface after removal of the coatings. Surface cleansing is often performed as a secondary or subsequent process to ensure that most contaminants, including PMB particle contaminants, are removed from the surface of the substrate. These secondary or subsequent processes involve expending additional time and labor.

For a variety of reasons, material removal techniques for removing paint from large surfaces, and surfaces having topological anomalies such as rivets, have not proven wholly satisfactory. Thus, it can be appreciated that coating removal, and particularly, the removal of paint from large and often delicate surfaces such as found on aircraft and automobiles, is a problem that has not been satisfactorily solved.

SUMMARY OF THE INVENTION

A method and apparatus are provided for removing coatings or contaminants from a substrate, such as paint, adhesives, and other coatings. The method comprises the steps of: irradiating a target area of a substrate radiant energy having an intensity sufficient to pyrolyze and/or ablate the coating or contaminant without substantially damaging the substrate; phase transitioning a source of liquid carbon dioxide to carbon dioxide gas and carbon dioxide snow; and impinging the target area with a stream of low temperature carbon dioxide gas or low temperature carbon dioxide snow, or a combination thereof, to remove the material from the structure, clean the exposed surface and cool the substrate.

The method for removing a material coating or contaminant from a substrate is implemented by a system or apparatus comprising a housing; a radiant energy source mounted in the housing for irradiating the target area of the substrate with the radiant energy sufficient to pyrolyze and/or ablate the substrate coating or contaminant; a liquid carbon dioxide source; an expansion chamber disposed adjacent to the housing and proximate to the liquid carbon dioxide source; and a nozzle connected to the expansion chamber for discharging the carbon dioxide. The expansion chamber is adapted receive the liquid carbon dioxide where the liquid carbon dioxide undergoes phase transition into low temperature carbon dioxide gas and low temperature carbon dioxide snow. The nozzle is adapted for directing the combination of carbon dioxide gas and carbon dioxide snow to the target area of the substrate.

The apparatus is controlled with the use of a central control processor which is adapted for controlling, among other things, the rate of liquid carbon dioxide introduced into the expansion chamber which directly affects the phase transition of the liquid carbon dioxide, the velocity of the carbon dioxide gas and carbon dioxide snow exiting the nozzle and impinging the target area, and the frequency, magnitude and pulse width of the radiant energy source.

The method of control used with the present invention can further include: photodetecting systems which are adapted for detecting various optical characteristics of the surface of the structure; photoacoustic systems which are adapted for detecting the photoacoustic signature signals form the surface of the structure; or video control systems which are adapted for recording and displaying the visual characteristics to allow an operator to manually control the operating characteristics of the system.

A significant advantage of the invention is that it produces a coating removal technique that is gentle and benign to underlying substrates. A low energy carbon dioxide stream is directed to the substrate which disposes or clears the ablated/pyrolyzed coating from the substrate while simultaneously cleaning and, more importantly, cooling the substrate surface.

The carbon dioxide stream is formed from a liquid carbon dioxide source which passes through an expansion chamber and undergoes phase transition to yield predetermined amount of low temperature carbon dioxide gas and/or low temperature carbon dioxide snow. Such an arrangement eliminates the need for the carbon dioxide pelletizer, the carbon dioxide pellet transport hopper, and the compressed carrier gas used in related systems.

It is well established that the above described combination process is more benign than either an energetic pulsed light or a blast jet based process alone. Furthermore, in addition to being more economical and practical, the above described combination process is also thought to be even more benign than a combination process using pulsed radiant energy together with a solid particle blast jet process.

The invention is ideally suited for removing coatings from delicate, thin, or composite substrates. Another advantage of the invention is that it may be economically employed to remove coatings from large areas under the control of a data processor.

Accordingly it is a principle object of the present invention to provide a system and method for removing paints and other coatings from substrates that are easily damaged by other devices.

Another object is to provide a system and method for removing paints and other coatings from substrates that provides sufficient cooling and cleaning of the substrate concurrently with the coating removal.

Another object is to provide a system and method for removing paints and other coatings from substrates that is relatively economical to manufacture, operate, and maintain.

Another object is to provide a system and method for removing paints and other coatings from substrates that is non-abrasive, does not use solid particles, and therefore does not produce excessive waste.

The disclosed method and apparatus for removing contaminants and coatings from a substrate using pulsed radiant energy and liquid carbon dioxide realizes the aforementioned objects, features and advantages in a manner that is clearly evident from a thorough consideration of the drawings and detailed description that follows.

BRIEF DESCRIPTION OF THE DRAWINGS

Throughout the specification and drawings, like components are referenced using like reference numerals.

DETAILED DESCRIPTION OF THE INVENTION

While the present invention is being described in terms of a preferred embodiment, it is to be understood that the invention is not to be limited to the exact form of the apparatus or method disclosed. Therefore, it is to be understood that the invention may be practiced in a manner other than as specifically described without departing from the scope of the claims.

The present invention provides a gentle process and system for removing coatings and contaminants from a substrate by irradiating a target area of a substrate radiant energy having an intensity sufficient to pyrolyze and/or ablate the coating or contaminant without substantially damaging the substrate; phase transitioning a source of liquid carbon dioxide to carbon dioxide gas and carbon dioxide snow; and impinging the target area with a stream of low temperature carbon dioxide gas or low temperature carbon dioxide snow, or a combination thereof, to remove the material from the structure, clean the exposed surface and cool the substrate. The present invention is particularly suitable for removing paint from the surfaces of frangible substrates such as plastic, aluminum, and carbon-epoxy. The invention is expected to find wide use in the paint removal industry in applications where particle media blast techniques or prolonged exposure to high temperature environments would damage the underlying substrate surface.

Figure 1:
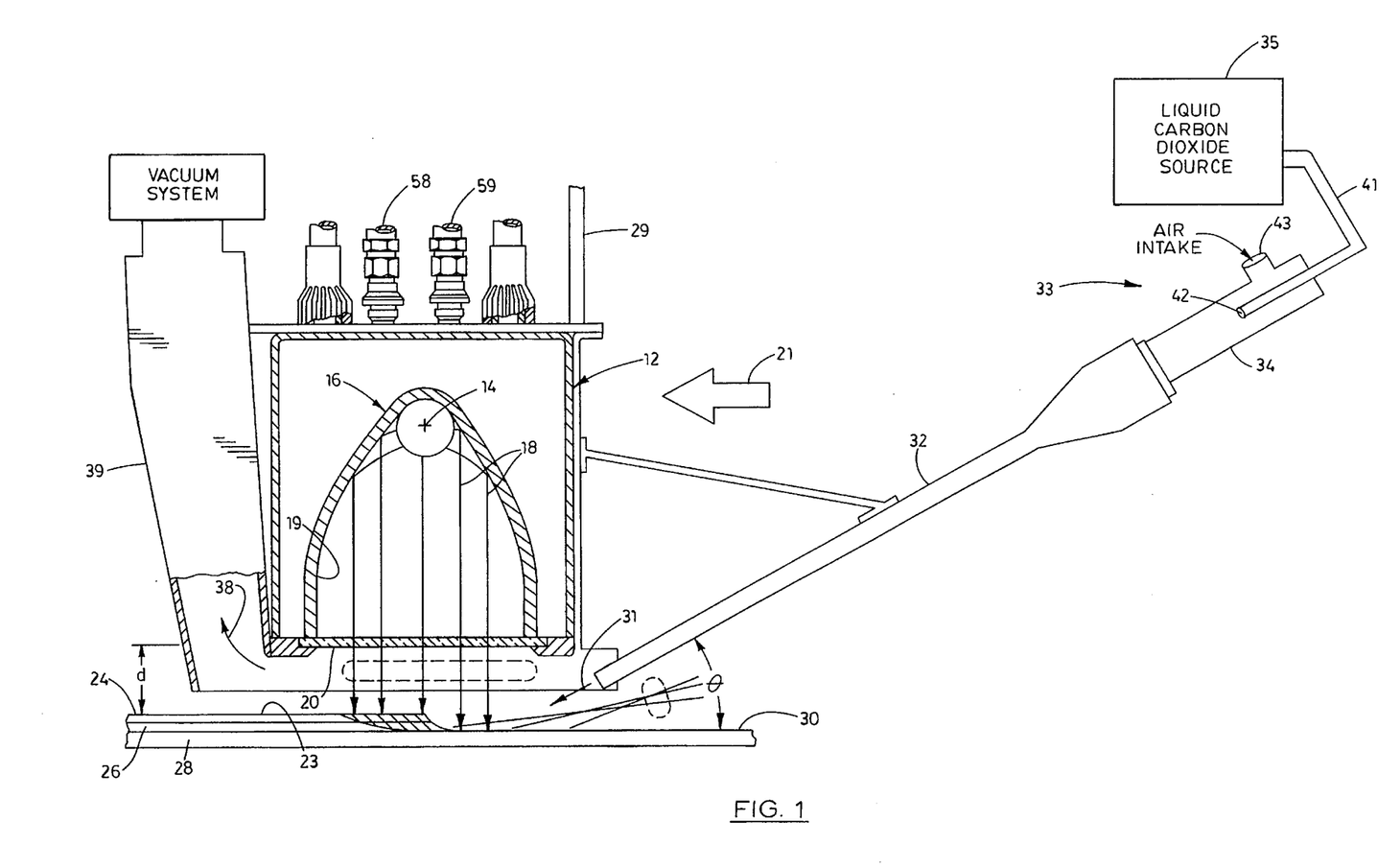
FIG. 1 is a schematic diagram of an apparatus embodying various features of the present invention for removing a coating or contaminant from a substrate by ablating the coating or contaminant from the surface of the substrate and impinging the surface with a stream of carbon dioxide.

Referring to FIG. 1, there is shown a system 10 particularly adapted for implementing the present invention. System 10 includes a housing 12 in which is mounted a radiant energy source such as an optical energy source 14 and a reflector 16 such that optical energy (shown as arrows 18) generated by the optical energy source 14 is directed and/or reflected off of a reflective surface 19 through a window 20 so as to irradiate a target area on the surface 23 of a structure 22. As an example, the structure 22 is comprised of substrate 28 on which is formed layers 26 and 24. Although the structure 22 may include any number of layers, for purposes of illustration, the structure is described herein as having two layers 24 and 26. The optical energy source 14 and reflector 16 are preferably cooled by deionized water provided from a water supply (not shown) to interior of housing 12 through inlet tube 58 and returned through outlet tube 59.

Housing 12 is supported by manipulator 29 which may be controlled to move housing 12 over the surface 23 of structure 22 at a standoff distance, d, in order to irradiate and scan the structure with optical energy generated by optical energy source 14. Standoff distance d represents the perpendicular distance between window 20 and the top surface 23 of structure 22. A CIMROC 4000 Robot Controller manufactured by CIMCORP Precision Systems, Inc., Shoreview, Minn. is an example of a suitable manipulator 29.

In the preferred embodiment, the optical energy source 14 may be a broadband flashlamp. The output of a broadband flashlamp offers the advantage of providing a wide variety of electromagnetic spectrum components, enhancing the probability that some of the components will be absorbed by a wide variety of different materials. A flashlamp offers the further advantage of being readily adaptable for irradiating relatively large areas at the same time.

The optical energy source 14 irradiates a target area on the surface 23 of the structure 22 whereby the coating material irradiated by light energy absorbs the light energy in the form of heat. If the optical power intensity at the irradiated surface 23 of the material is sufficient, the material vaporizes, or is ablated. The ablation mode of many coatings occurs as a two step process. First, the coating is pyrolyzed which involves the breaking of chemical bonds within the coating. This results in reduced adhesion of the coating to the underlying substrate. Second, the smaller molecules remaining from the pyrolysis are subsequently individually ablated or burned producing even smaller molecules of primarily $CO_2$, $H_2O$ and other combustion by-products. Hence, the ablation process is the rapid decomposition and vaporization of a material resulting from the absorption of energy by the material. Continued irradiation causes continued ablation, and hence removal of the irradiated coating material from the underlying structure.

The intensity of light energy 18 incident on structure 22 must be sufficient so that in response to being irradiated, layers 24 and 26 absorb enough light energy 18 that is converted to heat such that the layers 24 and 26 ablate or at least pyrolyze. The degree of ablation and/or pyrolysis of the layers 24 and 26 as a result of a single optical pulse is determined by the pulse width of optical energy source 14, the thickness of the layers, and the thermal characteristics of the materials comprising the structure.

A major advantage of the invention is that the system 10 can be controlled, as explained more fully herein, so that layers 24 and 26 may be removed or ablated from the surface 30 of substrate 28 without damaging the substrate. Such damage would be evidenced by changes in the mechanical properties of the substrate such as the modulus of elasticity, shear strength, and tensile strength. Changes in the mechanical properties of the substrate are undesirable and are indicative of alteration in the chemical structure of the substrate as compared to its original chemical structure before layers 24 and 26 are removed.

The embodiment of the invention further includes a stream of carbon dioxide 31 mixed with air which is ejected from a nozzle 32 and directed toward the target area of the substrate 28 so as to drive away the vapors of any removed layers from the substrate 28 while simultaneously cleaning and cooling the substrate 28. Removing the vapors from around the target area that result from the ablation/pyrolysis of the material essentially prevents the vapors from depositing on the window of the flashlamp or other optical components of the system. The carbon dioxide stream 31 is provided to the nozzle 32 via an expansion chamber 34 from a liquid carbon dioxide source 35 that is appropriately mixed with air.

The expansion chamber 34 is adapted to receive the liquid carbon dioxide where it is mixed with an air stream. Within the expansion chamber, the liquid carbon dioxide undergoes phase transition into low temperature carbon dioxide gas and low temperature carbon dioxide snow. The combination of carbon dioxide snow and carbon dioxide gas and air exits the expansion chamber via a nozzle 32 whereby it forms a low kinetic energy stream of carbon dioxide snow entrained in a gas.

The nozzle 32 is adapted for directing the combination of gas and carbon dioxide snow at the target area of the substrate 28. Nozzle 32 is mounted to housing 12 so that as the housing 12 is translated, optical energy source 14 is moved to scan different target areas of structure 22 with nozzle 32 following.

In this manner, the structure 22 is subjected to a continuous process whereby optical energy source 14 scans structure 22 to irradiate and pyrolyze/ablate selected regions of the structure 22 while carbon dioxide stream 31 disperses or drives away the material. As the carbon dioxide stream 31 impinges the surface 30 of the substrate 28, it provides a means for controlling the temperature of, i.e. cooling, the surface 30 of the substrate 28 so that it does not become hot enough to sustain heat damage. The carbon dioxide stream 31 is also particularly adapted for removing various contaminants and cleaning the exposed surface 30 of the substrate 28 while simultaneously preventing material debris and vapors from depositing on the flashlamp system.

The invention is controlled with the use of a central control processor which is adapted for controlling, among other things, the rate of liquid carbon dioxide introduced into the expansion chamber, the phase transition of the liquid carbon dioxide, the velocity of the carbon dioxide gas and carbon dioxide snow exiting the nozzle and impinging the target area, and the frequency, magnitude and pulse width of the radiant energy source.

The method of control used with the present invention can further include: photodetecting systems which are adapted for detecting various optical characteristics of the surface of the structure; photoacoustic systems which are adapted for detecting the photoacoustic signature signals form the surface of the structure; or video control systems which are adapted for recording and displaying the visual characteristics to allow an operator to manually control the operating characteristics of the system.

During this process, vacuum system 37 draws the ablated and pyrolyzed material (shown as arrow 38) away from the irradiation site through nozzle 39. Such vacuum systems are well known in the art.

The incident intensity of light energy 18 must be great enough to initiate the ablation/pyrolysis of substantial amounts of layers 24 and 26 at the target area. For most materials expected to be removed by this process, the incident intensity of light energy 18 should generally be in the range of about 18–25 joules/$cm^2$ at a full-width, half-maximum (FWHM) pulse, between about 1000–2000 microseconds and typically 1700 microseconds, and time to peak of about 1 millisecond. Alternative embodiments contemplate using different repetition rates and pulse widths. The scope of the present embodiment of the invention includes utilization of incidence intensities ranging anywhere up to 30 joules/$cm^2$. Control of the intensity of radiant energy incident on the surface 23 of structure 22 is easily effected primarily by employing an optical energy source 14 having a suitable output, and secondarily by establishing a suitable standoff distance d between the surface 23 of the structure 22 and the source of optical energy 14 at a scan rate that may typically be about 2.54 cm/second.

Figure 2:
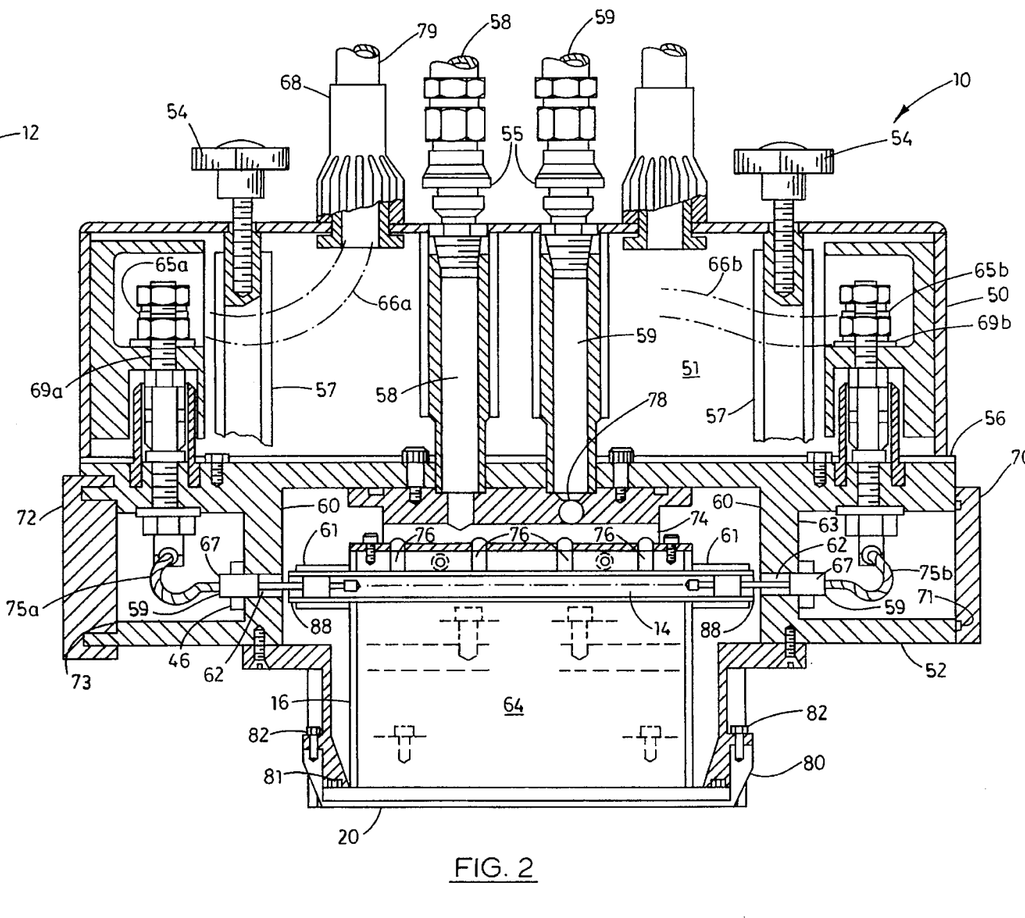
FIG. 2 is a front, cross-sectional, elevation view of the housing in which the light source and reflector are mounted.
Figure 3:
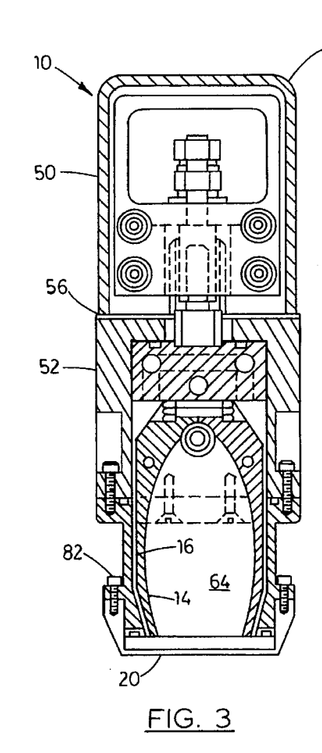
FIG. 3 is a side, cross-sectional, elevation view of the flashlamp mounted in the housing.

Referring to FIGS. 2 and 3, a preferred system for removing contaminants and coatings from a substrate 10 preferably includes broadband xenon flashlamp 14 mounted in housing 12. Broadband optical energy generally refers to optical energy that includes spectral components with wavelengths that may range from 170 nm to 5000 nm. A flashlamp or flashtube is a gas filled device which converts electrical energy to optical energy by passing current through a plasma typically contained in a transparent tube through which the optical energy is transmitted. Housing 12 include upper housing 50 attached to lower housing 52 by fasteners 54. Reflector 16 is mounted in lower housing 52 so that portions of light generated by flashlamp 14 are reflected out of housing 12 through quartz window 20. Housing 12 may be fabricated from black, hard anodized aluminum. Gasket 56 is interposed between upper and lower housings 50 and 52 to keep moist air from penetrating chamber 51 in upper housing 50. Electrical connectors 67 at the ends of optical energy source 14 are supported in and extend through apertures 62 in walls 63 of lower housing 52. Flashlamp 14 is positioned within fused quartz water jacket 61 mounted between walls 60 of lower housing 52. The position of flashlamp 14 is maintained by "O"-ring compression fittings 46 that fit over electrical connectors 67, and are fastened to walls 63 by threaded fasteners, not shown. "O"-rings 59 interposed between compression fittings 46 and walls 63 provided a water tight seal therebetween. By way of example, reflector 16 may have an elliptical cross-section as shown in FIG. 3, having a major axis of 7.00 cm, a minor axis of 2.80 cm, and a length of about 15.00 cm. In such case, the longitudinal axis of flashlamp 14 is generally coincident with a focus of reflector 16. However, it is to be understood that the cross-section of reflector 516 may be shaped in a variety of ways, preferably for example, as a keyhole or cusp.

Referring to FIG. 2, access to flashlamp 14 is obtained through removable access plates 70 and 72 releasably mounted to lower housing 52 by means, not shown, as would be known by those skilled in the art. "O"-ring 71 provides a watertight seal between access plate 70 and lower housing 52. Likewise, "O"-ring 73 provides a watertight seal between access plate 72 and lower housing 52.

Electrical power to energize flashlamp 14 is conventionally provided by high voltage coaxial cable 79 that penetrates upper housing 50 through cable fitting 68 and includes center conductor 66a and braided conductor strap 66b. Center conductor 66 is conventionally connected to high voltage terminal post 69a with a lug 65a soldered or brazed to the center conductor. Terminal post 69a is electrically connected to flashlamp 14 via braided cable 75a brazed to high voltage electrical connector 67. Electrical return is provided by braided cable 75b brazed or soldered to low voltage electrical connector 67 and to terminal post 69b. The end of braided conductor strap 66b is terminated with lug 65b which is connected to terminal post 69b.

Flashlamp 14 may be removed from lower housing 52 as follows: First, electrical power must be disconnected from housing 12. Then, quick connect fittings 55 are disconnected from inlet and outlet tubes 58 and 59, respectively. Fasteners 54 are removed from stantions 57 connected to lower housing 52 so that the lower housing may be separated from upper housing 50. Then, access plates 70 and 72 are removed from lower housing 52. Braided cables 75a and 75b are unbolted from terminal posts 69a and 69b, respectively. Compression fittings 46 are unfastened from walls 63 and slipped out over their respective braided cables 75a and 75b. Then, flashlamp 14 may be carefully slipped out of water jacket 61 through either of apertures 62 and out of lower housing 52. Replacement of flashlamp 14 is accomplished by performing in reverse order, the steps recited above for removing the flashlamp.

Light generated by flashlamp 14 is emitted through quartz water jacket 61 and exits lower housing 52 through window 20 either directly, or by reflecting off of reflective surface 19 of reflector 16. Window 20 is preferably manufactured of fused quartz or other synthetic materials that have excellent transparency and high resistance to heat. Further, the transparency of the window should not degrade from exposure to ultraviolet light. Gasket 81 is interposed between window 20 and window frame 80 so that the window 20 is held in a watertight arrangement to lower housing 52 by bolts 82.

Flashlamp 14 and reflector 16 are preferably cooled with deionized water having a temperature, for example, of about 50° F. supplied at a rate of about 2 gallons per minute from a water supply (not shown) to housing 12 through inlet tube 58 and returned through outlet tube 59. The deionized water preferably has an electrical resistance of at least 1 megohm. Inlet tube 58 penetrates upper housing 50 and is connected to manifold 74, mounted in lower housing 52, having multiple outlets 76 which penetrate reflector cavity 64 to distribute water over the length of flashlamp 14 and fill the reflector cavity 64. Water also penetrates the tapered ends 88 of quartz water jacket 61 to cool electrical connectors 67 and flashlamp 14. Heat resulting from the generation of radiant energy from flashlamp 14 is absorbed by the water and transported out of chamber 64 through port 78 in fluid communication with outlet tube 59.

It is well known that in order to maximize the service life of a flashlamp, the operation of the flashlamp should be critically damped, that is, it should be operated with a dampening coefficient of about 0.77. Factors that determine the dampening coefficient of a flashlamp include: inductance of a single mesh pulse forming network ("PFN") typically employed in a flashlamp power circuit, capacitance, C, of the PFN, arc length of the flashlamp, and operating voltage, V, across the terminals of the flashlamp. The energy output, E, of a flashlamp is characterized by the relation $E=CV^2$. However, V should only be varied by no more than about ±5 per cent of the optimum voltage in order to maximize service life. Further, it is not practical to vary C because of the expense of additional capacitors required to implement such a circuit and because of the life limiting character of this type of circuit. Therefore, in order to maximize the useful life of a flashlamp, it is preferably operated at a constant repetition rate with a fixed pulse width.

By way of example only, a flashlamp may be configured as having a tube filled with xenon gas at a pressure of 450 Torr, a bore of about 17 mm, and an arc length of about 12 inches. Typical pulse lengths for a xenon flash lamp are between 1 μsec and 5 msec. The energy required for this system for a given coating on a given substrate can be readily empirically determined. This particular flashlamp is preferably operated at a repetition rate of 4–6 Hz with a FWHM fixed pulse width of about 1700 microseconds and an input energy of about 200 joules/cm of arc length, although in some circumstances it might be desirable to have a greater repetition rate and a shorter pulse width. As is characteristic, the useful output energy of a flashlamp available to irradiate the surface 23 of structure 22 (see FIG. 1) is approximately 20–25 per cent of the input energy to the flashlamp. The flashlamp is powered by a suitable power supply, not shown, as would be known by those of ordinary skill in the art.

Because a flashlamp is operated with a damping coefficient of about 0.77, the preferred method of controlling the energy flux (joules/second) at the surface 23 of structure 22 is to establish an appropriate distance between the flashlamp 14 and the surface 23 of the structure 22 since the incident energy intensity at the surface 23 of the structure 22 is generally inversely proportional to the distance between the surface and the flashlamp 14. The distance between the flashlamp 14 and the surface 23 of structure 22 is more conveniently discussed with reference to the standoff distance, d, between the surface 23 of structure 22 and window 20, since the window 20 and the flashlamp 14 are a fixed distance apart.

The temperature of layers 24 and 26 are a function of the optical energy output of flashlamp 14 that is absorbed by the layers 24 and 26, the repetition rate of the flashlamp (or of any other radiant energy source), the albedo of the surface of layer 26 (the "surface" layer) the relative speed (also referred to as the scan rate) between flashlamp 14 and structure 22, the distance between flashlamp 14 and the surface 23 of structure 22, the temperature of carbon dioxide stream 31, and the mass flow rate of the carbon dioxide stream 31. However, to maximize the service life of flashlamp 14, the flashlamp 14 is preferably operated at a constant repetition rate. The present invention advantageously allows varying the temperature and mass flow rate of carbon dioxide stream 31 to control the temperature of layers 24 and 26.

Preferably, the temperature of layers 24 and 26, as well as the temperature of substrate 28, may be controlled by varying the mass flow rate of carbon dioxide stream 31 because the carbon dioxide stream 31 absorbs heat energy from substrate 22. Thus, if it were desirable to lower the temperature at the surface 30 of substrate 28, whether or not overlying layers 24 or 26 have been removed, the mass flow rate of carbon dioxide stream 31 may be increased. Conversely, in some circumstances it may be desirable to increase the temperature of layers 24 and 26 to assure that they are sufficiently ablated prior to impingement of the exposed surface by the carbon dioxide stream 31. In such case, the mass flow rate of carbon dioxide stream 31 may be decreased.

Alternatively, a suitable scan speed and standoff distance are determined experimentally. A structure is scanned at an initial trial scan speed using the system and methods described with reference to FIG. 1. The initial trial speed at which the surface of structure 22 is scanned is intentionally controlled to be high enough so that at a given intensity of optical energy at the surface of structure 22, an insufficient amount of layers 24 and 26 are removed. The high scan speed avoids damaging substrate 28 by preventing too much optical energy from being absorbed by structure 22. Then, the scan speed is decreased until, at a given incident intensity determined by the standoff distance, sufficient material is removed from layers 24 and 26 so as to exposed the surface of substrate 28 in undamaged condition. If at the slowest scan speed, layers 24 and 26 are not sufficiently removed from substrate 28, the standoff distance is reduced and a new set of scan speed tests are conducted as described above. This process is repeated until a combination of scan speed and standoff distance result in exposure of substrate 28 without damage.

Typically, the standoff distance, d, is controlled to provide an incident intensity at the surface 23 of structure 22 that may be in the range of 18–25 joules/cm$^2$. If the surface 30 of substrate 28 is damaged, a faster scan speed may be tried. The maximum scan speed is limited by the performance characteristics of manipulator 29. If substrate 28 is damaged at the fastest reasonable scan speed of manipulator 29, then the standoff distance, d, should be increased.

By way of example, the invention may be operated where the incidence intensity at the surface 23 of structure 22 is about 18–25 joules/cm$^2$ with a scan speed that may range from about 2.54–3.0 cm/second.

The operation of the present invention is described with reference to FIG. 1. Initially, manipulator 29 is positioned so that the standoff distance, d, between window 20 and the surface 23 of structure 22 is such that the radiant energy flux provided by optical energy 18 at the surface 23 of structure 22 is sufficient to initiate the ablation and/or pyrolysis of the layers 24 and 26. Manipulator 29 is controlled to locate housing 12 such that optical energy source 14 is positioned over the area of structure 22 from which layers 24 and 26 are to be removed. Deionized water circulates through housing 12 to cool reflector 16 and optical energy source 14. The optical energy source 14 is then enabled and directed to irradiate and scan the surface of structure 22. Immediately thereafter, the carbon dioxide stream 31 is directed to impinge the surface of structure 22 and the vacuum system 37 is enabled to collect and remove the material 38 and expended carbon dioxide stream 31 from the target area.

Pulsed optical energy 18 incident on the target area of the surface 23 of structure 22 is absorbed and converted to heat, causing layers 24 and 26 to ablate. Exposure of additional areas of substrate 28 is accomplished by moving housing 12 so that optical energy source 14 scans structure 22 in the direction of arrow 21. During this time, the carbon dioxide stream 31 is directed to impinge the ablated/pyrolyzed region of layers 24 and 26. The carbon dioxide stream 31 is directed to impinge the structure 22 to clean and cool the surface 30 of substrate 22 while simultaneously dispersing the remains of the layers 24 and 26 thereby preventing any residual debris or vapors from depositing on the optical components (i.e. window) of the system 10.

The vacuum system 37 continuously draws the material 38 and expended carbon dioxide stream 31 through vacuum nozzle 36 to collect and remove them from the vicinity of the target area at the surface of structure 22. Because the carbon dioxide stream 31 is directed to impinge the surface of structure 22 at an angle, θ, the remains of layers 24 and 26 and carbon dioxide stream 31 are ultimately dispersed towards the vacuum nozzle.

Optical energy source 14 is directed to scan structure 22 until a sufficient area of substrate 28 has been exposed and cleaned, at which time the system 10 may be shut down.

Figure 4:
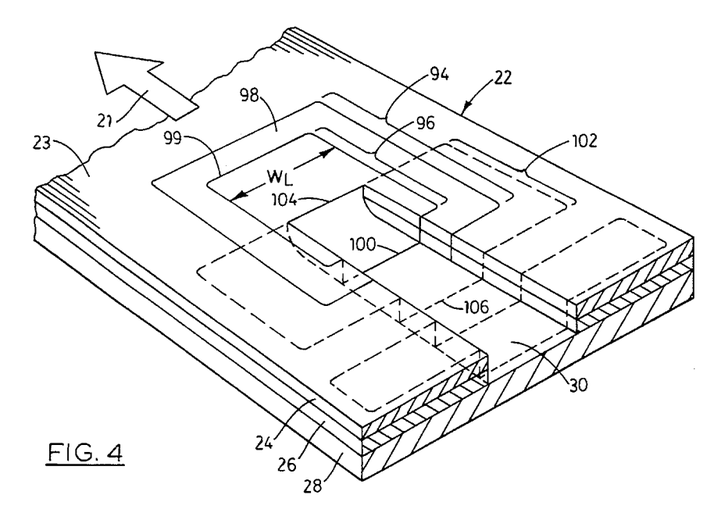
FIG. 4 illustrates the target area of the light source and the footprint of the carbon dioxide stream on the surface of the structure.

Referring now to FIG. 4, light energy 18, not shown in FIG. 4, directed incident on the surface 23 of structure 22 results in a "footprint" or illuminated area 94 on the structure. Area 94 includes a focus or "target" area 96, having a width, $W_L$, that is subjected to the more intense irradiation and is surrounded by penumbra area 98 which is subjected to less intense irradiation. As optical energy source scans across surface 23 in the direction of arrow 21, layers 24 and 26 subjected to the more intense irradiation under focus area 96 are pyrolyzed and/or ablated. Area 96 has a "leading" edge 99 and a "trailing" edge 100. For purposes of illustration, and by way of example only, area 96 is shown to be substantially rectangular. However, the shape of area 96 depends on the particular configuration of reflector, which may be selected to suit the requirements of a specific application.

Figure 5:
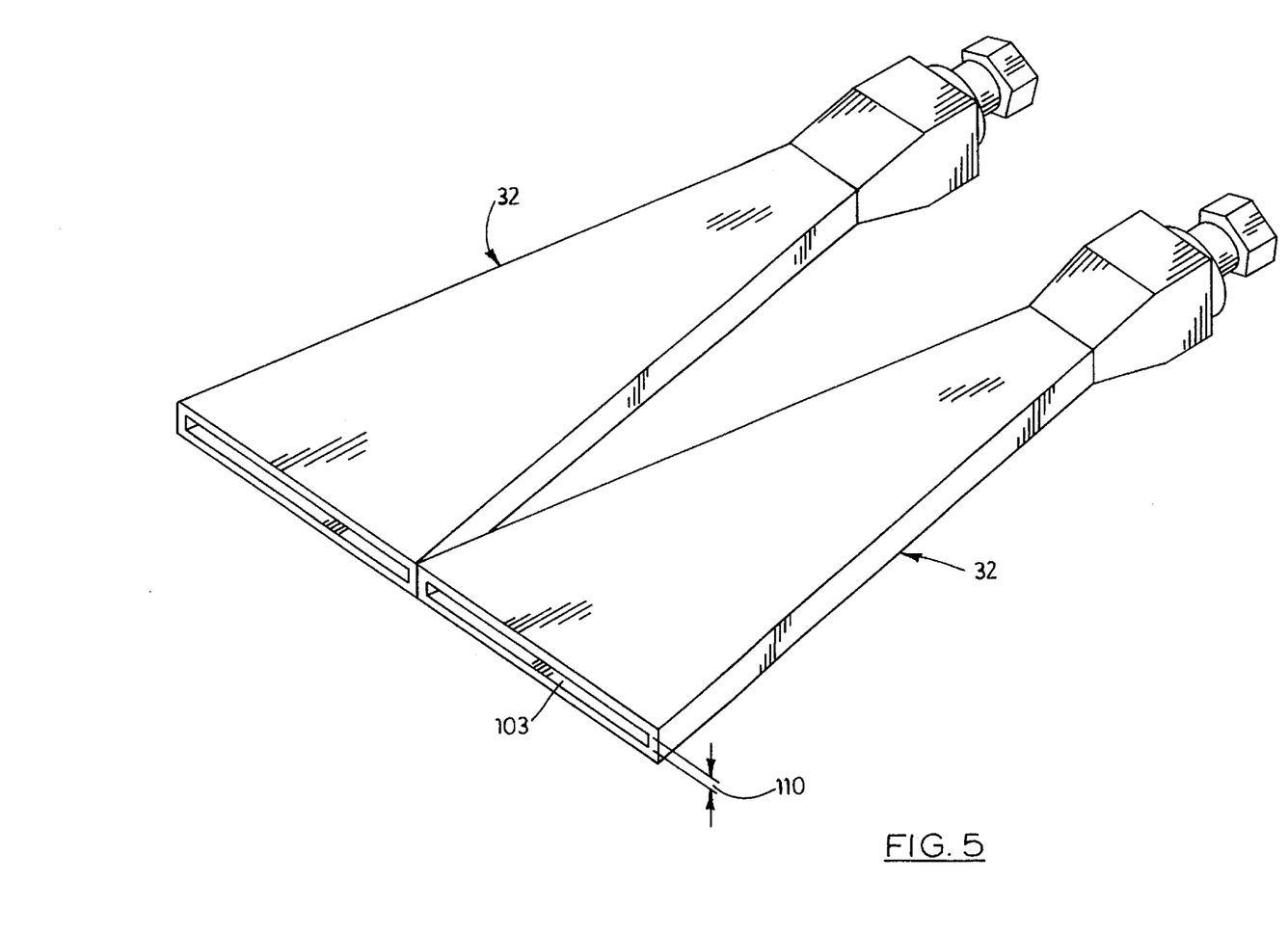
FIG. 5 shows the outlet of the nozzle through which the carbon dioxide stream is ejected.

As optical energy source scans surface 23, carbon dioxide stream 31 (not shown in FIG. 4) is directed to and impinges the surface 23 in the direction of arrow 21 with a pattern or footprint 102 that is determined by the shape of the outlet 103 of nozzle 32, shown in FIG. 5. The surface of structure 22 intended to be irradiated by optical energy source may be referred to as a "target area." Preferably, footprint 102, having a trailing edge 106, overlies a portion of area 96 such that the leading edge 104 of footprint 102 is just slightly ahead of the trailing edge 100 of area 96 in order to assure that carbon dioxide stream impinges affected regions of layers 24 and 26. In other words, the optical energy source and carbon dioxide stream may overlap the target area at the same time. However, it is to be understood that the leading edge 104 of footprint 102 of carbon dioxide stream may also impinge behind the affected regions of layers 24 and 26 provided that the region impinged by carbon dioxide stream is in an ablated state. In this case, the target area is first irradiated by optical energy source, and then momentarily later, is impinged by carbon dioxide stream which results in the removal of layers 24 and 26 to expose some of the surface 30 and preventing the debris or vapors from depositing on the window of the flashlamp.

The shape of footprint 93 is determined by the shape of outlet 103 of nozzle 32 and the angle, θ, between the flow axis 108 of nozzle 32 and the surface 30 of substrate 28, as seen in FIG. 1. In an example of the preferred embodiment, the shape of outlet 103 may be an elongated rectangle, as shown, in FIG. 5 or oval.

Figure 6:
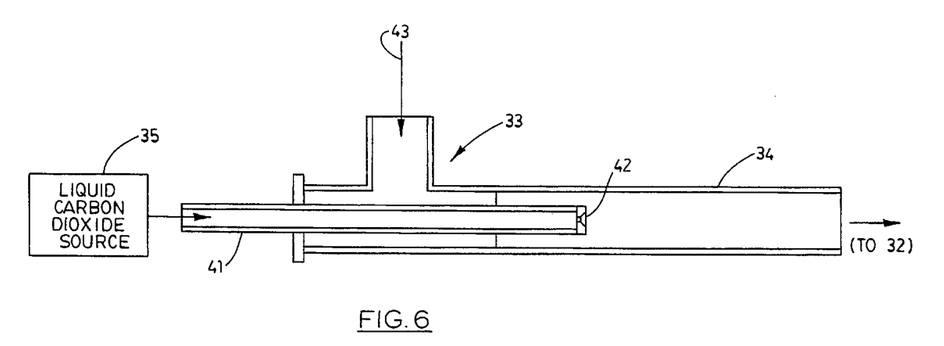
FIG. 6 shows a cross-sectional view of the liquid carbon dioxide processing chamber where the liquid carbon dioxide source transitions to carbon dioxide gas and/or carbon dioxide snow suitable for use as a cleaning and cooling agent.

FIG. 6 shows a cross-sectional view of the liquid carbon dioxide processing subsystem 33 where the liquid carbon dioxide source 35 undergoes phase transition to carbon dioxide gas and/or carbon dioxide snow. The liquid carbon dioxide processing subsystem 33 preferably comprises a liquid carbon dioxide source 35; a liquid carbon dioxide injection tube 41; an injection valve or orifice 42 adapted to control the rate of liquid carbon dioxide injection; an air inlet port 43; and an expansion chamber 34. The expansion chamber 34 is an enclosed chamber of a predetermined volume adapted to receive the liquid carbon dioxide source 35 where the liquid carbon dioxide expands under controlled conditions to form low temperature carbon dioxide gas and low temperature carbon dioxide snow. The phase transitioning of the liquid carbon dioxide source 35 is controlled in part by the rate at which the liquid carbon dioxide source 35 is injected into the expansion chamber 34, the volume of the expansion chamber 34, and the air introduced into the expansion chamber 34.

Subsequent to the phase transitioning of the liquid carbon dioxide source 35, the carbon dioxide gas and/or carbon dioxide snow are directed to the nozzle 32. The nozzle 32 is adapted for directing the combination of carbon dioxide gas and carbon dioxide snow at the target area of the structure. The carbon dioxide stream, which consists of carbon dioxide snow within a gas stream provides an enhanced cooling effect of substrate 28 as compared to pelletized carbon dioxide attributable to the increased effective surface area of the low temperature carbon dioxide.

The second embodiment also provides a benign process and system for removing coatings from a substrate without damaging the substrate. However, in addition to the system described with regard to the first embodiment, the second embodiment further features a digital data processor which coordinates and controls the scan rate of optical energy and carbon dioxide stream across the surface of substrate. Control is effected using feedback provided by a detecting device such as an optical detecting circuit that detects the optical character of the surface of structure.

Figure 7:
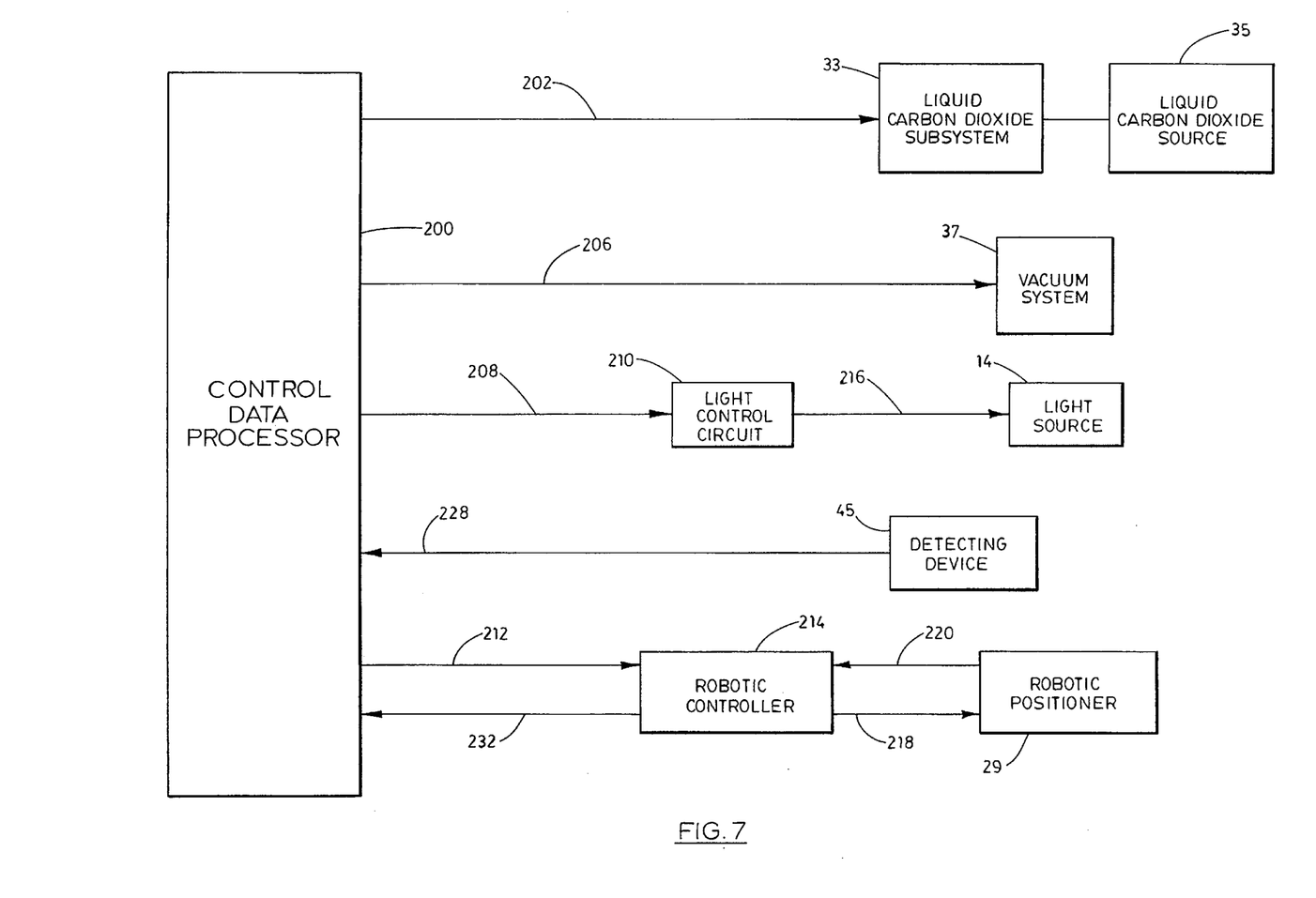
FIG. 7 is a block diagram of an embodiment of a system embodying various features of the present invention that employs a central control processor used to control certain parameters affecting the removal of the coating or contaminant.

Referring now to FIG. 7, which is a block diagram of another embodiment of a system embodying various features of the above described embodiment, the central control processor generates a signal 202 which enables the liquid carbon dioxide source 35 and is further adapted to control certain parameters of the liquid carbon dioxide subsystem 33. In this manner, the mass flow rate of the carbon dioxide stream, the temperature of the carbon dioxide stream, and the physical composition of the carbon dioxide stream are controlled.

The central control processor 200 also generates a signal 206 which enables the vacuum system 37. In addition, the central control processor 200 generates a signal 208 adapted to control the output of the optical light source 14 by means of a light control circuit 210. Light control circuit 210 generates a control signal 216 which establish the repetition rate and pulse width of the output of optical energy source 14 depending on the substrate surface and the coating materials that require removal.

The central control processor 200 also furnishes an output signal 212 which provides path and speed instructions to robotics controller 214. Robotics controller 214 transforms signal 212 into control signals 218, 220 that direct the path and speed of robotics positioner 29. The path of robotics controller 214 is determined in accordance with a suitable path-generating processing routine that is implemented by the central control processor 200 in accordance with techniques well known by those skilled in the art.

The central control processor 200 may be an IBM AT or AT compatible personal computer. As discussed above, the central control processor 200 may receive feedback data 228 from a detecting device 45 as well as a signal 232 from the robotics controller. Specifically, the feedback data may be collected from photodetecting systems, photoacoustic systems, or video control systems. Photodetecting systems are adapted for detecting various optical characteristics of the surface of the structure and/or the substrate. Photoacoustic systems, on the other hand, are adapted for detecting the photoacoustic signature signals from the surface of the structure or substrate. Signals corresponding to these optical or acoustic characteristics are fed into the central control processor. Various photodetecting systems and photoacoustic detection systems are discussed in detail in U.S. Pat. Nos. 5,194,723, 5,204,517, and 5,328,517, incorporated herein by reference.

An alternative control system involves the use of various video control systems which are adapted for recording and displaying the visual characteristics to allow an operator to manually control the operating characteristics of the system in real time by an operator using visual feedback based on observation of the trail of exposed surface. Such visual feedback may, for example, be provided by direct observation, or by a television system, not shown. If the operator observes that insufficient material is being removed at a particular region, the scan speed may be decreased, the standoff distance, d, may be reduced, or the carbon dioxide stream may be varied by the operator.

Figure 8:
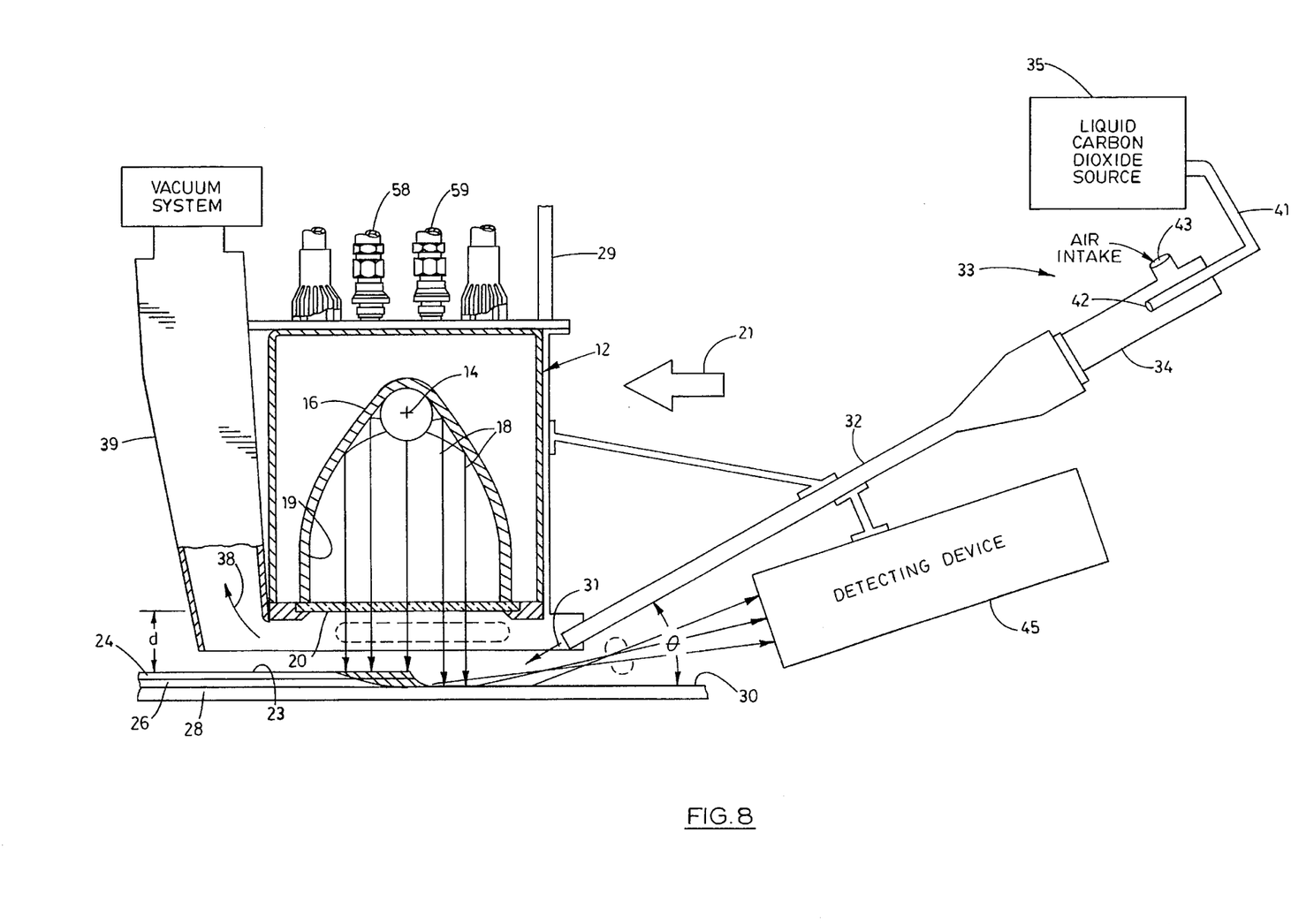
FIG. 8 is a schematic diagram of another embodiment of a system embodying various features of the present invention which includes optical or acoustic feed back to control the removal of the coating.

Referring to FIG. 8, there is shown housing 12, optical energy source 14 and reflector 16, as described above with regard to the first embodiment and as represented by FIG. 1. Housing 12 is supported by robotics positioner or manipulator 29 at a predetermined standoff distance from the surface 23 of structure 22. The standoff distance is determined as described further herein. Robotics positioner or manipulator 29 is controlled to move housing 12 along a predetermined path at a controlled scan speed over the surface 23 of structure 22 so that optical energy source 14 and carbon dioxide stream 31 may be directed to scan and impinge, respectively, the coating or coatings formed on the surface 30 of substrate 28. Material removed from the surface 30 of substrate 28 and the expended carbon dioxide stream 30 after it impinges structure 22 are collected by vacuum system 37 through nozzle 39 mounted to housing 12.

A detecting device 45 is mounted to housing 12 by means not shown and detects the predetermined physical, acoustic or optical characteristics of the surface 23 of structure 22 and substrate 28 and generates an output signal which is subsequently fed back to the central control processor (See FIG. 7).

The carbon dioxide stream or "snow" manages the temperature and cleaning of the painted substrate by varying the carbon dioxide pressure and air mixture flow rate. The carbon dioxide pressure and orifice size, or flow opening to the nozzle, dictate the liquid carbon dioxide flow rate, or amount of "snow" deposited onto the painted surface. This flow rate controls the cooling level required to maintain an acceptable surface operating temperature. The carbon dioxide pressure is operated from the computer via an electric control valve, enabling real time adjustment. As indicated above, the carbon dioxide stream essentially prevents the depositing and accumulation of vapors on the window of the system as well as contributes to the cleaning of the substrate. Both of these aspects are controlled by varying the flow rate of the air mixed with the carbon dioxide. This operation is again controlled via an electrical control valve operated from the main control computer. The inventor would envision a video camera which would monitor the surface soot deposits, such as a color sensor, in-turn varying the air flow rate. The present carbon dioxide control system is operated in a manual fashion, but would be upgraded to automatic operation, as described above, for a turn-key system.

EXAMPLE

The pulsed power modulator or lamp power source, is preferably operated between about 2000 and 2300 volts at an operating frequency of 4 Hz or 4 pulses per second. These electrical characteristics result in an average operating power of 18 to 24 kW. The lamp and reflector assembly are moved across the paint surface at a velocity of about 1 to 1.2 inches per second, maintaining a stand-off distance of about 1.5 to 1.8 inches. The carbon dioxide pressure is maintained between about 250 and 270 psi through a ⅛ inch orifice resulting in a flow rate between about 2.4 and 2.7 gallons per minute. The carbon dioxide is mixed with air, flowing at about 220 cubic feet per minute, at the nozzle resulting in a pressurized carbon dioxide stream of carbon dioxide gas and snow to the paint surface.

Liquid carbon dioxide at high pressure is transported from a storage vessel. There is a slight pressure drop in the liquid carbon dioxide as the liquid carbon dioxide flows along the conduit and injection tube connecting the storage vessel and orifice. The liquid carbon dioxide is then expanded through the orifice which is located at the end of the liquid carbon dioxide injection tube. As the liquid carbon dioxide passes into the expansion chamber it flashes or changes phase into solid carbon dioxide snow and gaseous carbon dioxide. The preferred ratio is approximately 55% carbon dioxide snow and 45% carbon dioxide gas. The phase transition occurs immediately upon the expansion and corresponding reduction in pressure, preferably yielding a carbon dioxide gas/snow mixture at approximately −80° C. and approximately 1 atmosphere of pressure. Ideally, the expansion and phase transition occurs at a constant enthalpy. The orifice supports the pressure drop between the liquid carbon dioxide in the injection tube and the approximately 1 atmosphere of pressure in the expansion chamber.

Operation under the aforementioned conditions would remove between 1 and 4 mils of paint from a painted aluminum or composite substrate. The amount of material removed depends on many variables including the color and reflection coefficient (i.e. reflectivity) of the material to be removed. The carbon dioxide stream impinges the painted surface 1 to 2 inches behind the optical footprint at an angle between 20 and 40 degrees. The carbon dioxide stream keeps the painted substrate at an acceptable temperature level. The actual temperature is dictated by the application in which the system is used and can be controlled by adjusting the carbon dioxide operating parameters. The carbon dioxide stream further cleans the surface following the ablation and/or pyrolysis process and prevents the ablated material from depositing on the equipment.

From the forgoing description, those skilled in the art will appreciate that all the objects, advantages and features of the present invention are realized. A method and apparatus has been shown and described for removing a coating from a substrate using pulsed radiant energy and liquid carbon dioxide.

While a specific process and system for removing a coating and cleaning a substrate has been shown and described, many variations are possible. Those persons skilled in the art will appreciate that certain modifications may be made to the invention without departing from its spirit, therefor, it is not intended that the scope of the invention be limited to the specific embodiment illustrated and described. Rather, it is intended that the scope of this invention be determined by the appending claims and their equivalents.

What is claimed is:

1. A system for removing material from a structure, comprising:
   a housing;
   a radiant energy source mounted to said housing for generating radiant energy to irradiate a target area of said structure at an intensity sufficient to initiate pyrolysis and ablation of said material without substantially damaging said structure;
   a liquid carbon dioxide source disposed proximate to said housing; and
   an expansion and delivery means connected to said liquid carbon dioxide source and adapted for phase transitioning said liquid carbon dioxide source to form and direct a low temperature stream of carbon dioxide gas and carbon dioxide snow to said target area to remove said material from said target area thereby preventing said material from accumulating proximate the radiant energy source while concurrently cleaning and cooling said structure.

2. The system of claim 1 wherein said radiant energy source is a flashlamp for generating optical energy.

3. The system of claim 2 wherein said expansion and delivery means further comprises:
   an expansion chamber connected to said liquid carbon dioxide source and adapted to receive and phase transition liquid carbon dioxide from said liquid carbon dioxide source to form a stream of carbon dioxide gas and carbon dioxide snow; and
   a nozzle connected to the expansion chamber for discharging and directing the stream of carbon dioxide gas and carbon dioxide snow to said target area to remove said material from said target area, clean said structure and cool said structure.

4. The system of claim 2 wherein the temperature of said structure is controlled by varying the mass flow rate of liquid carbon dioxide from said source of liquid carbon dioxide which phase transitions to said stream of low temperature carbon dioxide gas and low temperature carbon dioxide snow.

5. The system of claim 2 further comprising a collecting means mounted to said housing for collecting and removing said materials and said excess carbon dioxide.

6. The system of claim 5 wherein said collecting means is a vacuum system mounted to the exterior of said housing for collecting and removing said materials and said excess carbon dioxide.

7. The system of claim 2 further comprising a means for detecting characteristics of said target area of said structure in order to assure said optical energy generated by said flashlamp irradiates said target area with the amount of radiant energy sufficient to initiate pyrolysis and ablation of said material without substantially damaging said structure.

8. A system for removing material from a structure, comprising:
   a housing;
   a radiant energy source mounted to said housing for generating radiant energy to irradiate a target area of said structure at an intensity sufficient to initiate pyrolysis and ablation of said material without substantially damaging said structure;

a liquid carbon dioxide source disposed proximate to said housing;

an expansion chamber connected to said liquid carbon dioxide source and adapted for receiving and phase transitioning liquid carbon dioxide from said liquid carbon dioxide source to form a stream of low temperature carbon dioxide gas and carbon dioxide snow; and a nozzle connected to the expansion chamber for discharging and directing the stream of carbon dioxide gas and carbon dioxide snow to said target area to remove said material from said target area, clean said structure and cool said structure.

9. The system of claim 8 further comprising:

an injection valve operatively connecting said liquid carbon dioxide source with said expansion chamber and adapted to control the rate of liquid carbon dioxide injection into the expansion chamber; and an adjustable air inlet port communicating with said expansion chamber and adapted to control the conditions under which said liquid carbon dioxide source phase transitions into a combination of liquid carbon dioxide gas and liquid carbon dioxide snow.

10. The system of claim 9 wherein said radiant energy source is a flashlamp for generating optical energy.

11. The system of claim 9 wherein the temperature of said structure is controlled by varying the mass flow rate of liquid carbon dioxide from said source of liquid carbon dioxide which phase transitions to said stream of low temperature carbon dioxide gas and low temperature carbon dioxide snow.

12. The system of claim 9 wherein the temperature of said structure is controlled by varying said conditions under which said liquid carbon dioxide source phase transitions liquid carbon dioxide into a combination of liquid carbon dioxide gas and liquid carbon dioxide snow through adjustment of said air inlet port.

* * * * *